April 16, 1963   G. E. OSTERSTROM   3,085,437
DIFFERENTIAL PRESSURE TRANSDUCER
Filed May 24, 1960   2 Sheets-Sheet 1
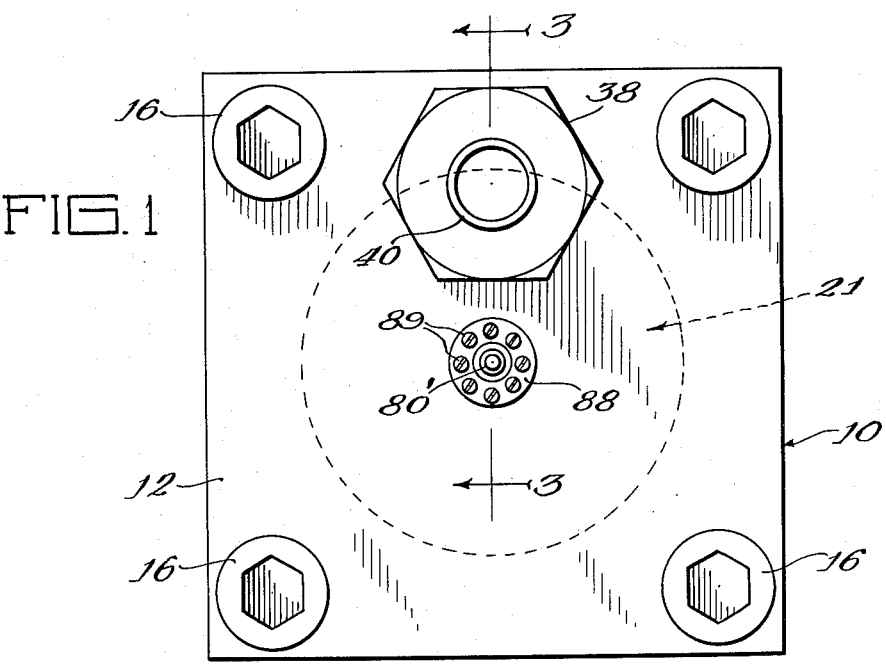
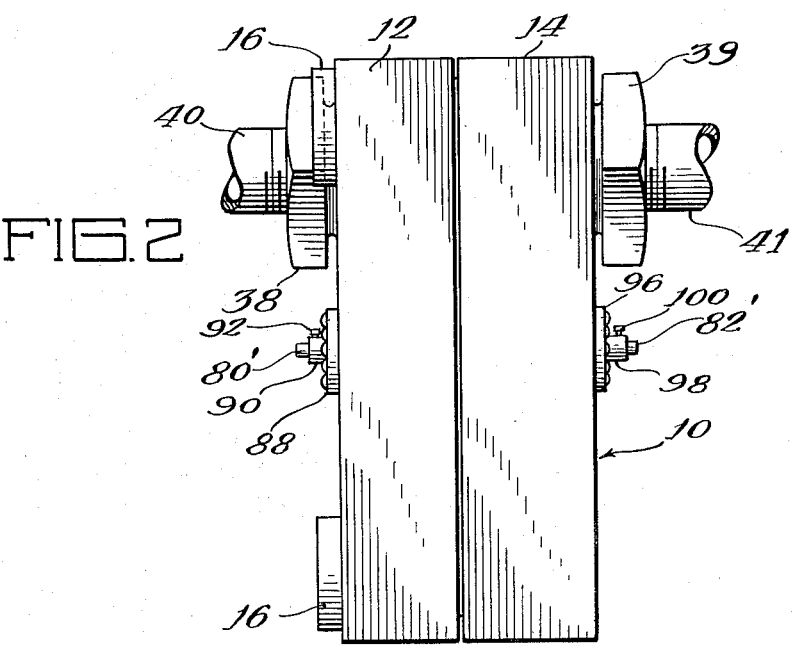
Inventor:
Gordon E. Osterstrom
By: Stephen J. Rudy
Attorney April 16, 1963   G. E. OSTERSTROM   3,085,437
DIFFERENTIAL PRESSURE TRANSDUCER
Filed May 24, 1960   2 Sheets-Sheet 2
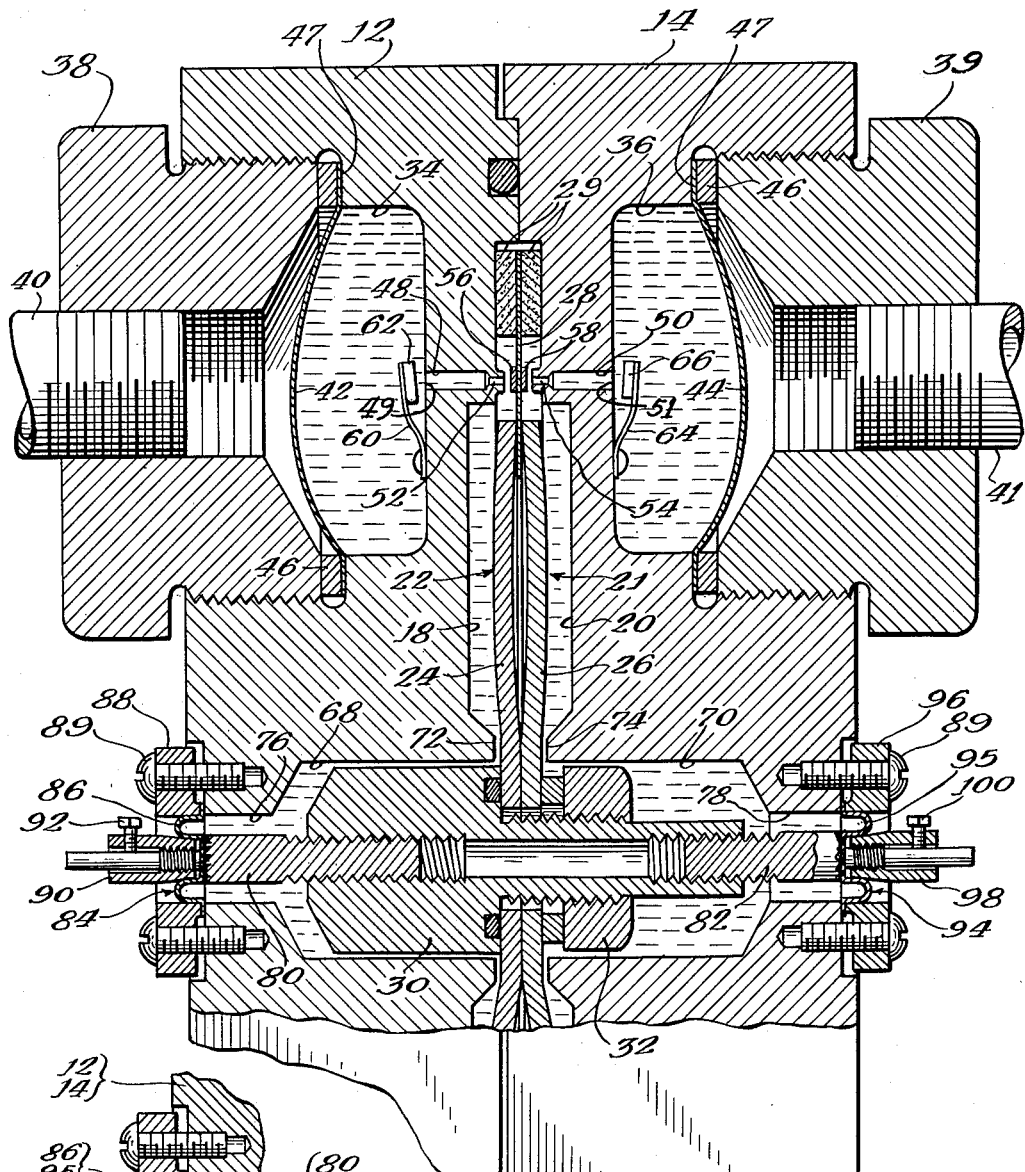
Inventor
Gordon E. Osterstrom
By: Stephen J. Rudy
Attorney United States Patent Office
3,085,437
Patented Apr. 16, 1963

3,085,437
DIFFERENTIAL PRESSURE TRANSDUCER
Gordon E. Osterstrom, Winnetka, Ill., assignor to GPE Controls, Inc., Chicago, Ill., a corporation of Illinois
Filed May 24, 1960, Ser. No. 31,475
12 Claims. (Cl. 73—407)

This invention relates to a transducer which generates a force signal in an external member directly proportional to differential pressure.

The transducer with which this invention is concerned is of the type having a liquid enclosed diaphragm arranged to cause movement of a transmission rod normally restrained by external force measuring means in response to pressure differential applied to the diaphragm. In such type of control element it is a prime objective to obtain the highest possible sensitivity and accuracy over the full operating range of the transducer. One area of difficulty concerns the problem of sealing projecting ends of the transmission rod so as to avoid leakage, minimize friction load, and avoid development of extraneous forces upon the transmission rod, such as may be caused by seal area imbalance.

The transducer of the present invention will be found to provide a high degree of sensitivity and accuracy over full operating range. More particularly, the transducer of the present invention includes sealing means for the projecting ends of the transmission rod, which will not leak, are substantially friction free, and which avoid development of extraneous forces on the transmission rod due to seal area imbalance. Actually, the resulting force on the transmission rod of the subject transducer, is dependent almost entirely upon the pressure differential developed upon the diaphragm. Other features incorporated in the transducer of the invention are an over-range protection means, and a ruptured seal protection means. In addition, the subject transducer is adapted for bi-directional operation.

The main object of this invention is to provide a transducer which generates a force signal directly proportional to differential pressure, and which displays a high degree of sensitivity and accuracy over full operating range of the transducer.

A more specific object of the invention is to provide a sealing means for the projecting ends of a transmission rod of a transducer, which sealing means are leakproof, will minimize friction load, and will avoid development of extraneous forces on the transmission rod, such as may be caused by seal area imbalance.

Still another object of the present invention is to provide a transducer with sealing means for each projecting end of a transmission rod, which sealing means may each be adjusted so that the effective force acting upon said sealing means will be balanced.

Another object of the present invention is to provide a transducer having an over-range protection means which protects a liquid enclosed diaphragm against rupture due to excessive pressure differential thereupon.

Still another object of the present invention is to provide a transducer having a ruptured seal protection means to prevent leakage of fluid being measured in the event of rupture of a transmission rod sealing means.

These and further objects and features of the present invention become more apparent from the following description and accompanying drawings wherein:

FIG. 1 is an end view of a transducer illustrative of an embodiment of the invention;

FIG. 2 is a side view of the transducer of FIG. 1;

FIG. 3 is an enlarged section generally as seen along line 3—3 in FIG. 1; and,

FIG. 4 is a fragmentary section view of a modified form of transmission rod sealing means for use in the transducer of FIG. 1.

Referring now to the drawings and particularly to FIGS. 1 and 2, the numeral 10 identifies a transducer which embodies the principles of the subject invention. The transducer includes a pair of housings 12 and 14 which are secured together by a fastening means, such as bolts, or screws 16. The engaging surfaces of the housings 12 and 14 are formed to provide circular recesses 18 and 20 respectively, which serve to form a diaphragm cavity 21 enclosing a signal diaphragm assembly 22. A signal diaphragm assembly, includes a pair of disc-like members 24 and 26, and a distensible elastic annular membrane 28, the latter being securely clamped and sealed about its inner region by the disc-like members 24 and 26, and being clamped about its outer region by a gasket means 29, compressibly arranged within the diaphragm cavity 21. The disc-like members 24, 26 are secured to a spindle assembly 30, as best seen in FIG. 3. The signal diaphragm assembly thus provides an impermeable but movable partition within the diaphragm cavity 21.

Each housing portion 12, 14 is further formed to provide oppositely arranged pressure cavities 34, 36 respectively, into which, pipe fittings 38, 39 extend to close the end of each cavity and to threadably receive pipe or conduit means 40, 41. Conduits 40 and 41 lead to fluid pressure sources (not shown), whose difference in pressure is to be converted to analogous force by the transducer. In such manner, the transducer may be used in measuring such things as flow rate, liquid level, or any fluid medium parameter associable with a pressure differential. Within the cavities 34, 36 are arranged isolating membranes 42, 44 respectively, which are flexible, elastically distensible, and preferably have negligible rigidity. Each isolating membrane 42, 44 is securely clamped about its periphery between a washer 46 and a shoulder means 47 provided within the housings 12, 14 adjacent the side walls of the cavities 34, 36 respectively.

Passageway means 48, 50 extend between the cavities 34, 36 respectively, and the diaphragm cavity 21. The inner ends of the passageways 48, 50 are of reduced diameter providing ports 52, 54 respectively. Valve facings 56, 58 are mounted on opposite sides of the annular membrane 28 in alignment with the passageway ports 52, 54 respectively. Within the cavity 34 is a spring means 60 arranged to support a valve facing 62 in spaced relation to a port 49 defined by the passageway 48, while a similar spring means 64 in cavity 36 is arranged to maintain a valve facing 66 in spaced relation to a port 51 defined by the passageway 50. Under certain conditions, it may be found desirable to eliminate springs 60 and 64, and to mount the valve facings 62, 66 directly upon the membranes 42, 44 respectively or eliminate 62 and 66 entirely so that the membranes themselves would seat upon the ends of passageways 48, 50 respectively.

The spindle assembly 30 is arranged for movement in a cavity formed by bores 68, 70 provided in the housings 12, 14 respectively. The diameter of bores 68, 70 is sufficiently large to provide ample clearance between the spindle assembly and surrounding bores. It will be seen that the periphery defined by the inner end of the diaphragm cavity 21 is formed to provide circular protrusions 72, 74 which serve as fixed stops to limit the axial movement of the diaphragm assembly 22. The outer ends of the bores 68, 70, are formed with reduced diameter portions 76, 78 respectively to receive in spaced relation transmission rods 80, 82, each of which is secured to the spindle assembly 30 as shown. Either transmission rod may be coupled to some type of external force measuring means adapted to convert the force signal into a reading indicative of a value being measured viz., flow rate, liquid level, etc. The ideal force measuring means used for this purpose will require no displacement of the transmission rod. A practical measuring means should hold the displacement to a minimum.

A thin, disc-like seal means 84, having a semi-toroidal surface in an unsupported region and cylindrical surfaces in regions supported by the inner circumference of a clamping flange 88 and the outer circumference of a tapered sleeve member 90, is affixed to the transmission rod 80 and outer transmission rod 80' as by soldering, the outer peripheral edge of said seal means being clamped to the housing 12 about the edge of the reduced diameter portion 76, by means of the clamping flange 88. The tapered sleeve member 90, which is mounted for axial adjustment on the transmission rod 80', is adapted to engage a side wall of the convolute surface for adjustment of the effective area of the seal means 84, which is subjected to pressure forces acting outwardly parallel with the transmission rod 80, as will be more clearly seen hereinafter. A set screw 92 is arranged for maintaining the tapered sleeve in adjusted position upon the transmission rod 80'. A similar seal means 94 is likewise secured to the transmission rod 82, and has its peripheral edge clamped to the housing 14 by means of a clamping flange 96. A tapered sleeve 98, which is mounted for axial adjustment upon the transmission rod 82', is adapted for adjustment of the effective area of the seal means 94, while a set screw 100 is provided for maintaining the tapered sleeve in adjusted position upon the transmission rod 82'. If found desirable, the tapered surfaces for adjusting the seal means 84, 94, may be formed on the clamping flanges 88, 96 respectively, instead of on the sleeves 90, 98.

A modified form of sealing means arrangement is illustrated in FIG. 4. The modified form of sealing means includes transmission rod extensions 102, each having a surface 104, which may vary from no taper to some maximum taper. The dimensions of the surface 104 is made to vary slightly between different rod extensions 102. By selective assembly, rod extension 102 may be used, the respective surfaces 104 thereof being such as to balance the effective area of such seal means 84, 94 as required.

From the foregoing it will be seen that two discrete liquid reservoirs separated by diaphragm assembly 22 are enclosed within the transducer 10, the first reservoir being defined by the cavity 34, the cylindrical recess 18, the spindle bore 68, and reduced diameter portion 76; the second reservoir being defined by the cavity 36, the circular recess 20, the spindle bore 70, and the reduced diameter portion 78. A force signal, brought outside the body by the transmission rods 80, 82, or transmission rod extensions 102, will be developed in direct proportion to the difference between the pressures acting upon the isolating membranes 42 and 44. In converting differential pressure to a force analogue, it will be seen that the desired transfer function is $F=kdP$, where F is net output force in the transmission rod, $k$ is some constant, and $dP$ is the differential pressure. If A is effective area component (perpendicular to the axis of transmission rod assemblage) of signal diaphragm assembly 22, a force $-F_1$ will be generated on the signal diaphragm assembly and spindle assemblage equal to $$PA-(P-dP)A=AdP$$

where P is the datum pressure of measured fluid connected to the right pressure connection 41 and the (—) sign denotes force acting to the left. If A can be considered a constant for all practical purposes, then A can be set equal to $k$, whereby $F_1=kdP$. This is the ideal form of transfer function as stated hereinbefore.

However, there are forces other than $F_1$ acting on the transmission rod assemblage 30, which must be considered. Pressure P in the circular recess 20, will be exerted on the inside of the seal means 94. If $A_{94}$ is that portion of the total seal annulus area projected to a plane perpendicular to spindle axis which receives its component of restraint from the spindle transmission rod 82 against the pressure forces tending to push the seal out, then an outward force on the transmission rod assemblage equal to $F_2=PA_{94}$ will occur, where $F_2$ is the outward force. If $A_{94}$ is assumed a constant and is set equal to $k_2$, then $F_2=k_2P$. Similarly, there is a force $F_3$ on the other seal means 84 of effective area $A_{84}$ due to pressure $(P-dP)$ in the circular recess 18, and $$F_3=(P-dP)A_{84}=-k_3(P-dP)$$

If all forces other than those described above are considered negligible, then the transfer function will be: $F=-F_1+F_2-F_3=-k_1dP+k_2P-k_3(P-dP)$. This expression shows that F will be the function of P as well as $dP$ unless $k_2=k_3$, in which case $$F=-k_1dP-k_2(P-dP)+k_2P=-(k_1+k_2)dP$$

Let $(k_1+k_2)=k$ then, $F=kdP$, which is the desired result.

In the subject transducer, the seal means 84 and 94 are fabricated as nearly alike as possible. The inside diameter of the clamping flanges 88 and 96, against which the pressure P forces the outer convolution surface of the seals, are also made as nearly alike as possible. The inside diameter of the seal means 84 and 94 may be adjusted by axial movement of the tapered sleeve members 90 and 98 respectively, or by selective assembly of the transmission rod extensions 102 having slightly different tapered surfaces 104 if necessary, as has been hereinbefore discussed. By such means, the areas $A_{84}$ and $A_{94}$, and the corresponding constants $k_2$ and $k_3$ referred to above can be made equal, and the response of the transducer will be dependent solely on differential pressure $dP$.

The over-range protection of the transducer of the invention will be seen to operate as follows. If the difference in pressure $dP$ between the two sides of the diaphragm assembly 22 is within the normal range of the transducer, neither valve facing 56 or 58 will cover adjacent valve ports 52 or 54, respectively. However, if the differential pressure $dP$ rises beyond normal range, the annular membrane 28 will be distended toward the port 52 or 54, whichever is transmitting the lower pressure, and the valve facing 56 or 58, as the case may be, will seat upon the end of the port and will prevent egress of liquid therethrough. Fluid trapped between the diaphragm assembly 22 and annular membrane 28 and the closed port, being incompressible, will prevent further deformation of the annular membrane. The trapped liquid may be thought of as supporting the diaphragm assembly 22 against destructive distortion. When the differential pressure returns to within normal range, the distended annular membrane 28 will assume normal position, resulting in unblocking of the closed port, and restoring normal pressure signal transmission to the diaphragm assembly 22.

An alternate construction (not shown) may incorporate separate valve facings functionally similar to valve facings 62 and 66, likewise maintained away from seating position upon the respective ports by being mounted on springs attached to the wall of the housings. In such a construction, the annular membrane 28, in the overpressure distended position, will press one of the valve facings against the adjacent port to close the port. Upon restoration of normal pressure conditions, the spring supporting the valve facing will move the latter to normal position, i.e., away from seating upon the adjacent port. Another arrangement would eliminate valve facings, so that the membrane 28 would directly seat upon the end of a port 52 or 54, which might then be in the form of a porous plug.

The ruptured seal protection feature of the transducer of the invention, is provided by the arrangement of the valve facings 62 and 66, which are held away from closure of the ends of the adjacent passageways 48 and 50 respectively, by means of the supporting springs 60 and 64. In the event of a ruptured seal means ie., 84 or 94, the signal diaphragm 28 will burst and liquid will escape from both cavities 36 and 34, until the isolating members 42 and 44 become distended and depress the spring means 60 and 64 respectively, and cause seating of a valve facing 62 or 66, to prevent release of fluid being measured. In such manner, the transducer will operate to avoid a dangerous situation when the fluid being measured is explosive, or of harmful quality.

It will be seen that the subject transducer is bi-directional since either pipe 40 or 41 may be connected to the upstream side of the fluid being measured without effecting the proper operation of the device.

From the foregoing, it will be seen that the transducer of the invention will operate to satisfy the objectives set forth in the early part of the specification.

The foregoing description has been given in detail without thought of limitation since the inventive principles involved are capable of assuming other forms without departing from the spirit of the invention or the scope of the following claims.

What is claimed is:

1. A transducer for generating a force signal in an external member directly proportional to differential pressure comprising, housing means formed to provide a diaphragm cavity, a signal diaphragm assembly arranged in said cavity and adapted to form a partition therein, a spindle assembly arranged in a bore formed in said housing means, said spindle assembly affixed to the inner region of said diaphragm assembly for movement therewith, transmission rod means affixed to the spindle assembly, said transmission rod means projecting from at least one side of said housing means, a pair of axially opposed sealing means affixed to said transmission rod means and to the housing means for sealing each end of said bore, and adjusting means to adjust the effective area of each of said sealing means against pressure forces acting thereupon in a direction parallel with the longitudinal axis of said spindle assembly whereby to avoid extraneous forces upon said spindle assembly due to seal area imbalance.

2. A transducer according to claim 1, wherein each of said sealing means is disc-like in form and includes an annular convolute surface of flexible cylindrical and toroidal combination form.

3. A transducer according to claim 2, wherein said adjusting means includes an adjusting member having a tapered surface engageable with a side wall of said convolute surface of one of said sealing means.

4. A transducer according to claim 3, wherein said adjusting member comprises a tapered sleeve means mounted for axial movement upon the transmission rod means.

5. A transducer according to claim 2, wherein said adjusting means comprises a pair of transmission rod extensions, which are adjusted in length during original transducer assembly to provide said adjustment of the sealing means.

6. A transducer for generating in an external member a force signal directly proportional to differential pressure comprising, housing means formed to provide a signal diaphragm cavity, a signal diaphragm assembly arranged in said cavity and adapted to form a partition therein, a spindle assembly arranged co-axially within a bore in said housing means and in spaced relation to the bore, said spindle assembly being affixed to the inner region of said diaphragm assembly for movement therewith along a longitudinal axis of the spindle assembly, transmission rod means affixed to the spindle assembly, said transmission rod means projecting from opposite sides of the housing means, a pair of mutually opposed sealing means affixed to act axially with respect to the transmission rod means and to the housing means for sealing each end of said bore, each of said sealing means comprising a thin disc-like element having an annular convolute surface of cylindrical and toroid combination form which bulges outwardly relative to said bore, said housing means being formed to provide a pressure cavity on each side of said signal diaphragm assembly which pressure cavities are each connected to the diaphragm cavity by passageway means, said cavities each being further arranged for connection to a pressure source to generate a pressure differential upon said diaphragm assembly, and an isolating membrane enclosing each of said pressure cavities, said transducer being arranged so that the pressure cavities, diaphragm cavity, and said bore are filled with a liquid to form two discrete liquid reservoirs separated by said partition, and adjusting means provided to adjust the effective area of each sealing means against pressure forces generated by liquid pressure in said reservoirs so that a resultant force acting upon one sealing means will be equal and opposite a resultant force acting upon the other sealing means.

7. A transducer according to claim 6, wherein each of said adjusting means comprises a sleeve means mounted for axial movement upon a transmission rod, which sleeve means is formed with a tapered surface engageable with a side wall of said sealing means convolute surface.

8. A transducer according to claim 7, wherein said signal diaphragm assembly includes two axially opposed disc-like members secured to the spindle assembly in liquid-tight manner, and an annular distendable, elastic member clamped about its inner periphery by said disc-like members in liquid-tight manner, and being further clamped about its outer periphery within said housing means in liquid-tight manner.

9. A transducer according to claim 8, wherein said signal diaphragm elastic member may block the end of either of said passageways when the pressure differential acting upon said diaphragm assembly attains a predetermined value, thus preventing flow of liquid out of the reservoir associated with the closed passageway.

10. A transducer according to claim 9, wherein a valve facing is arranged in each of said pressure cavities, each of said valve facings being movable for closing an end of an adjacent passageway under action of an associated isolating membrane.

11. A transducer according to claim 6, wherein said adjusting means comprises a pair of transmission rod extensions, which are selected during original transducer assembly to provide said adjustment of the sealing means.

12. A transducer for generating in an external member a force signal directly proportional to differential pressure comprising, housing means formed to provide a signal diaphragm cavity, a signal diaphragm assembly arranged in said cavity and adapted to form a partition therein, a spindle assembly arranged co-axially within a bore in said housing means and in spaced relation to the bore, said spindle assembly being affixed to the inner region of said diaphragm assembly for movement therewith, said signal diaphragm assembly, housing means and spindle assembly defining two discrete liquid reservoirs, transmission rod means affixed to the spindle assembly, said transmission rod means projecting from opposite sides of the housing means, a pair of mutually opposed sealing means affixed to act axially with respect to the transmission rod means and to the housing means for sealing each end of said bore, and adjusting means provided to adjust the effective area of each sealing means against pressure forces generated by liquid pressure in said reservoirs so that a resultant force acting upon one sealing means will be equal and opposite a resultant force action upon the other sealing means.

References Cited in the file of this patent

UNITED STATES PATENTS

| | | |
|---|---|---|
| 2,079,069 | Johnson | May 4, 1937 |
| 2,691,893 | Meyer | Oct. 19, 1954 |
| 2,977,991 | Bauer | Jan. 27, 1958 |

FOREIGN PATENTS

| | | |
|---|---|---|
| 819,538 | Great Britain | Sept. 2, 1959 |